US008816848B2

(12) United States Patent
Marino (10) Patent No.: US 8,816,848 B2
(45) Date of Patent: Aug. 26, 2014

(54) SYSTEMS AND METHODS FOR DETERMINING LOCATION FROM WIRELESS SIGNALS (75) Inventor: Nino Marino, Alameda, CA (US)

(73) Assignee: Sling Media, Inc., Foster City, CA (US)

(*) Notice: Subject to any disclaimer, the term of this patent is extended or adjusted under 35 U.S.C. 154(b) by 621 days.

(21) Appl. No.: 12/820,978

(22) Filed: Jun. 22, 2010

(65) Prior Publication Data

US 2011/0309933 A1    Dec. 22, 2011

(51) Int. Cl.
*G08B 1/08* (2006.01)

(52) U.S. Cl.
USPC ............ 340/539.13; 340/539.21; 340/539.23; 340/825.22; 340/825.49; 340/825.69; 370/252; 370/338; 455/410; 455/414.1

(58) Field of Classification Search
USPC ............. 340/539.21, 539.23, 539.13, 539.32, 340/825.22, 825.49, 825.69, 825.72, 539.1; 370/252, 338; 455/410, 414.1, 456, 455/456.1; 725/28, 51, 58
See application file for complete search history.

(56) References Cited

U.S. PATENT DOCUMENTS

| | | | |
|---|---|---|---|
| 6,563,430 B1 * | 5/2003 | Kemink et al. ................ 340/8.1 |
| 6,791,467 B1 * | 9/2004 | Ben-Ze'ev ................. 340/12.25 |
| 7,064,675 B2 * | 6/2006 | Zigmond et al. ........... 340/12.53 |
| 7,305,245 B2 | 12/2007 | Alizadeh-Shabdiz et al. |
| 7,403,762 B2 | 7/2008 | Morgan et al. |
| 7,414,988 B2 | 8/2008 | Jones et al. |
| 7,433,694 B2 | 10/2008 | Morgan et al. |
| 7,471,954 B2 | 12/2008 | Brachet et al. |
| 7,474,897 B2 | 1/2009 | Morgan et al. |
| 7,493,127 B2 | 2/2009 | Morgan et al. |
| 7,502,620 B2 | 3/2009 | Morgan et al. |
| 7,515,578 B2 | 4/2009 | Alizadeh-Shabdiz et al. |
| 7,551,579 B2 | 6/2009 | Alizadeh-Shabdiz et al. |
| 7,551,929 B2 | 6/2009 | Alizadeh-Shabdiz et al. |
| 2003/0034898 A1 * | 2/2003 | Shamoon et al. ........ 340/825.72 |
| 2007/0150918 A1 * | 6/2007 | Carpenter et al. .............. 725/25 |
| 2007/0171091 A1 | 7/2007 | Nisenboim et al. |

(Continued)

FOREIGN PATENT DOCUMENTS

| | | |
|---|---|---|
| WO | 03021851 A2 | 3/2003 |
| WO | 2005099173 A1 | 10/2005 |
| WO | 2009072735 A1 | 6/2009 |

OTHER PUBLICATIONS

International Searching Authority, International Search Report for PCT Patent Application No. PCT/US2011/039943, dated Aug. 24, 2011.

(Continued)

*Primary Examiner* — Hung T Nguyen
(74) *Attorney, Agent, or Firm* — Ingrassia Fisher & Lorenz, P.C.

(57) ABSTRACT

A computer, media player, remote control or other device is configured to determine its relative location within a home, office or other given environment based upon the reception and/or sensing of wireless network signals and/or other electromagnetic signals emitted by other devices present at any time in the environment. The device receives wireless signals from one or more wireless signal sources, and determines a parameter (e.g., signal strength) for the signals received from each source. The location of the portable device within the environment is determined based on the determined parameters. The location may be used for any purpose, such as adjusting a setting on the portable device, identifying another device to be controlled by a portable remote control, or the like.

17 Claims, 3 Drawing Sheets

(56) References Cited

U.S. PATENT DOCUMENTS

2008/0137631 A1   6/2008   deClerq et al.
2008/0180228 A1   7/2008   Wakefield et al.
2009/0102719 A1   4/2009   Lin
2010/0321201 A1*  12/2010  Huang et al. ............. 340/825.22

OTHER PUBLICATIONS

Malode, Deepak Ravi "Remote Control and Method for Automatically Adjusting the Volume Output of an Audio Device," U.S. Appl. No. 12/550,145, filed Aug. 28, 2009.

Thiyagarajan, Venkatesan "Systems and Methods for Virtual Remote Control of Streamed Media," U.S. Appl. No. 12/538,664, filed Aug. 10, 2009.

Paul, John et al. "Systems and Methods for Remotely Controlling Media Server Via a Network," U.S. Appl. No. 12/645,870, filed Dec. 23, 2009.

Skyhook Wireless, Inc. "Skyhook Wireless: How It Works," retrieved from the Internet at http://www.skyhookwireless.com/howitworks/coverage.php, Jun. 24, 2010.

Griedberg, Stroz "Source Code Analysis of Gstumbler," prepared for Google and Perkins Cole, Jun. 3, 2010.

* cited by examiner

SYSTEMS AND METHODS FOR DETERMINING LOCATION FROM WIRELESS SIGNALS

TECHNICAL FIELD

The following discussion generally relates to systems, devices and processes for detecting the location of a portable device within a home, office or other environment.

BACKGROUND

Computers, televisions, remote controls, media players and other devices continue to become increasingly mobile. Consumers now use a wide variety of portable electronics devices, including laptop, tablet and other mobile computers, personal digital assistants, mobile television and computer displays, remote controls and the like. Although much emphasis has been place upon mobility throughout the neighborhood or country, the widespread adoption of wireless local area network (WLAN) and similar wireless technologies has allowed users to roam freely within a home, office or other relatively close environment. A tablet computer, for example, can now be conveniently carried from room-to-room or office-to-office to allow the user to work, surf the web or enjoy media content anywhere in the local area environment.

While the increased mobility provides convenience and flexibility, the mobile user often loses the ability to select preferences or other settings that are commonplace on more stationary devices. A media player used in a child's bedroom, for example, may be set to take advantage of parental controls or simpler user interfaces that may not be desired for a media player in a living room or other location in the home environment. If a portable media player is shared between a child's room and a living room, however, desired settings for the child's room can be lost or undesirably imposed upon locations where they may not be wanted. Other portable devices, including remote controls, may have other location-specific needs or benefits that are not being realized using current technology. More stationary devices (e.g., desktop computer systems, televisions, and the like) may have location-specific benefits or needs as well.

It is therefore desirable to create systems and methods that are able to conveniently determine the location of a device within a home, office or other environment. These and other desirable features and characteristics will become apparent from the subsequent detailed description and the appended claims, taken in conjunction with the accompanying drawings and this background section.

BRIEF SUMMARY

According to various exemplary embodiments, systems and methods are described for determining the location of a computer, media player, remote control or other device within a home, office or other environment. This location may be used to adjust a setting on the device, to restrict access to the device, to select a media device that is controlled by a remote control, or for any other purpose.

Various embodiments provide a method executable by a device operating within a home, office or other environment. Wireless signals are received at the device from at least one wireless signal source, and a parameter of the wireless signals received from the at least one wireless signal sources is obtained. A location of the device within the environment is determined based on the measured parameter of the wireless signals, and a setting of the device is adjusted based upon the determined location of the device within the environment.

Other embodiments provide a device configured to operate within an environment. The device comprises a wireless receiver, a memory configured to store a plurality of settings, and a controller that is coupled to the wireless device and to the memory. The controller is configured to determine a location of the device within the environment based upon the signal strengths of the wireless networking signals received from each of the plurality of wireless transmitters, and to select one of the settings based upon the location.

Still other environments provide a method executable by a remote control, computer, media player or other portable device. For each of a plurality of known locations, signal strengths of signals received at the portable device from each of a plurality of wireless networks are initially measured and stored at the portable device. The strengths of the signals received at the portable device from each of the plurality of wireless networks are subsequently measured, and the subsequently-measured strengths are compared to the initially-measured signal strengths to thereby select one of the known locations. A setting (e.g., a user interface setting, a parental control, a communications setting used to communicate with a nearby device, or the like) is adjusted based upon the selected location.

These and other embodiments, aspects and other features are described in more detail below.

BRIEF DESCRIPTION OF THE DRAWING FIGURES

Exemplary embodiments will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

According to various embodiments, a portable or other device is able to determine its location within a home, office or other environment based upon the parameters of signals received from one or more wireless networks. The device receives signals from multiple wireless transmitters, measures the strengths or other parameters of the signals associated with each transmitter, and determines its location from the measured signal parameters. This location can be used for any number of purposes, including automatically adjusting a setting on the device, such as a parental control, user interface preference, access control, communications setting, and/or the like.

The general concepts set forth herein may be useful in many different types of portable or more stationary devices. In a remote control device, for example, the setting can be used to select an infrared, radio frequency or other control setting used to communicate with a television, set top box, receiver, media player or other controlled device that is located in relative proximity to the remote control. As a result, the remote control may be able to automatically select controlled devices based upon the determined position of the remote. Other types of portable devices that may benefit from location determination features include media players, portable computers, portable televisions, video game players, or any other devices as desired. More stationary devices such as desktop computers, televisions or the like may use location-based features as a security or anti-theft mechanism by prohibiting some or all operations if the device is removed from its known location. Many other uses, features and benefits could be formulated across a wide array of different embodiments.

Figure 1:
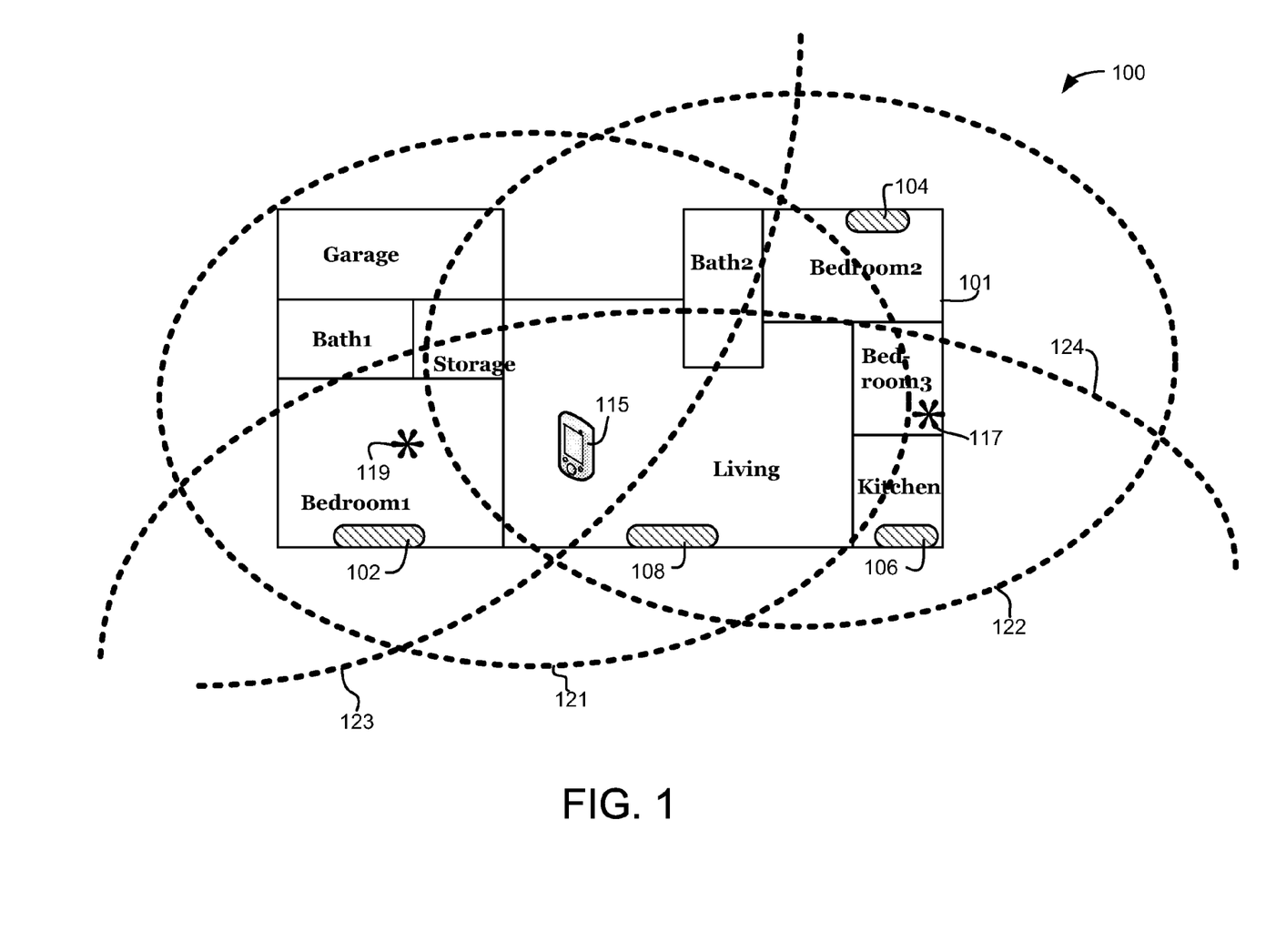
FIG. 1 is a block diagram an environment served by multiple wireless transmitters.

Turning now to the drawing figures and with initial reference to FIG. 1, an example of an environment 100 around a home, office or other structure 101 is shown. In this example, four wireless networks 121, 122, 123 and 124 have receivable radio signals propagating within the environment 100. Wireless networks 121 and 122 are shown to emanate from wireless routers, repeaters, access points or other transmitters within structure 101, for example, whereas networks 123 and 124 may emanate from transmitters located in neighboring homes or offices, public sources, telecommunications carriers and/or any other sources as appropriate. FIG. 1 shows one example for purposes of convenient illustration: equivalent concepts may be readily applied to any number of practical environments 100 served by any number of wireless networks 121-124.

Wireless networks 121-124 may be implemented in any manner. In various embodiments, networks 121-124 are each implemented using conventional wireless local area network (WLAN) technologies, such as any of the "Wi-Fi" networks described in various IEEE 802.11 standards. WLAN networks 121-124 may be readily implemented using widely-available router, bridge, access point and/or other technologies from any number of commercial sources. Wi-Fi and other WLAN networks are widely deployed in home, office, industrial, medical, academic and other settings, and many portable devices now incorporate built-in WLAN transceivers. Other embodiments may support other networks in place of or in addition to WLAN networks. Equivalent networks may consider wireless personal area networks (WPANs) such as conventional IEEE 802.15.4 ("ZIGBEE") networks, IEEE 802.15.1 ("BLUETOOTH") networks, and/or any other wireless networks that may be available. Although the various signals emanating from each transmitter are frequently described herein as separate networks, equivalent embodiments could separately process signals received from different transmitters that are both associated with the same logical or physical network. If a WLAN has multiple access points, for example, signals received from each of the different access points could be treated as separate "networks" for determining device location even though the signals relate to the same logical network. Further, some embodiments may process wireless signals that may not necessarily represent wireless networks but that are nevertheless produced by wireless signals sources nearby or within environment 100. Such signals may include microwave signals, RF signals received from any source nearby or within environment 100, and the like.

Device 115 is any media player, television, computer, tablet computer, mobile telephone, video gaming device, remote control or the like that is able to support wireless communications. Generally speaking, a device 115 can receive signals from each of the wireless networks 121-124, provided that the device 115 is physically located at a position that lies within the electromagnetic range of the particular network. Device 115 is illustrated in FIG. 1, for example, at a position that can receive signals from all four networks 121-124. In the illustrated position, device 115 will likely measure a relatively high strength of signals received from network 121, since device 115 happens to be located near the center of the network 121. Since device 115 is shown located near the periphery of networks 122 and 123, however, signals received from these networks may be comparatively weaker than signals that would be received near the center or broadcast point of those networks.

The availability of various networks 121-124 and the strengths of signals received from each network 121-124 will vary as device 115 is moved within environment 100. If device 115 were moved to from its illustrated location to location 117, for example, this position would be outside of the illustrated range of networks 121 and 123, but still within range of networks 122 and 124. Further, signals emanating from network 122 would be expected to get stronger as the device 115 is moved closer to the router or access point located near the center of network 122. Similarly, if device 115 were moved from location 117 to location 119 in FIG. 1, the device 115 would move beyond the illustrated range of network 122 but back into the illustrated range of network 121. The strength of network 124 may not vary significantly in this example because both locations 117 and 119 are shown approximately the same distance from the center of this network 124. Other embodiments would, of course, have widely varying network strengths and topologies, building arrangements, positions of interest, and/or the like.

Device 115 determines its position within environment 100 based upon the availability, strength and/or other parameters of received wireless network signals. In some embodiments, the changes in the strengths of signals received from the various networks 121-124 as the device 115 moves throughout the environment 100 can be monitored and mapped to various locations within the environment 100. That is, the strengths of signals received from the various networks 121-124 can be correlated to the position of device 115 within the environment. Other embodiments may simply consider the availability or non-availability of certain networks, as determined by the name, network identifier, security settings and/or other parameters contained within received signals. As device 115 moves within environment 100, then, known locations can be identified (using, e.g., user interface features), and signal strength or other parameter data observed at that location can be stored. During subsequent operation, then-current parameter information for one or more networks 121-124 can be compared to stored parameter data. If the current data correlates to stored data obtained at a known location, it may be deduced that the device 115 is at or near the known location.

The concept of determining a position based upon the parameters of received wireless network signals can be exploited in any number of ways. In various embodiments, a setting on device 115 that is portable may be changed or adapted in response to the position of the device 115 within environment 100. If location 117 in FIG. 1 corresponds to a child's bedroom, for example, a portable computer, media player or other device 115 may implement a child-friendly user interface and/or impose parental controls on streaming media or other content while the device 115 is located near location 117. If location 119 corresponds to a master bedroom, then device 115 may provide a more sophisticated interface and/or fewer content restrictions when the device 115 is located at or near location 119, to name just a few examples.

Any number of settings could be adjusted based upon the location of device 115 in various embodiments. For example, a cooking application could be opened (or at least made more prominent on a desktop or other user interface feature) when the device 115 is located in a kitchen. Further, the location of device 115 may be used to automatically adjust any sort of settings whatsoever within device 115, including interface settings, parental or administrative controls, user preferences, network access privileges, and/or any other features as desired.

Other embodiments could adjust security settings or the like based upon the location of the device. Office computers may be configured so that secret or confidential information is only viewable within secure parts of a building, for example, to prevent inadvertent disclosure to unauthorized people who may be present when device 115 is brought into a lobby or other public area. The device 115 could verify that it is at a known and approved location based upon received wireless network signals, for example, before granting access to certain functions or features. Security may be further enhanced by connecting to one of the received networks and/or requiring a userid/password combination or other authentication credential prior to access. To that end, location determination could be used to ensure that the device 115 is in an approved location prior to granting access to data, functions or other features. Any other access control, anti-theft or other security settings could be applied based upon the location of any sort of stationary and/or portable device 115, as desired.

Although the concepts described herein may be applicable to any number applications and devices 115, location determination may be particularly useful for remote control devices and the like. According to various embodiments, a portable remote control device 115 may use network signal strengths to identify locations that correlate to potentially-controllable devices 102, 104, 106, 108 within the environment 100. If the remote control device 115 is aware of its location and of any controllable devices 102, 104, 106, 108 that may be in relative proximity, then device 115 may be able to automatically select infrared (IR), radio frequency (RF) or other control codes that would be used to control the closest device(s) without express input from the user. As an example, device 115 may know from prior data that a television 102 is located at a position where network 121 is relatively strong, networks 123 and 124 are relatively weak and/or network 122 is not available. If the device 115 is later positioned at location 119, the measured signal strengths will more-or-less approximate the stored signal profile associated with television 102, indicating that the device 115 is at a position in relative proximity to television 102. As device 115 roams about building 101 and environment 100, device 115 may come into relative proximity with any number of televisions, set-top boxes, audio/video components, media players, or other media devices 102, 104, 106, 108.

"Relative proximity" in this sense means that the devices are near enough for further meaningful interaction. If a television or other media device 102 is in "relative proximity" to a portable control device 115, for example, the two devices are close enough that control device 115 is able to identify the media device 102 as an intended target and to communicate with the target media device 102 using IR, RF, network or other communications, as appropriate.

Equivalent concepts could be used to adjust temperature, lighting or other environmental controls in different rooms of building 101, and/or to control fireplaces, doors, windows, irrigation, pool controls, or any other electronically-controllable features within environment 100. Such adjustments may be made in response to user instructions, or automatically based upon the location of device 115. Lights or climate controls, for example, could be automatically activated as a device 115 enters a room or other area. The lights, climate controls, etc., could be similarly deactivated as the device 115 leaves the area (or after a period of time has elapsed following the device 115 leaving the area). As a person carries a remote control, mobile phone, personal digital assistant or other device 115 throughout environment 100 in such embodiments, device 115 could automatically detect this movement and make adjustments as desired. Again, any number of alternate but equivalent embodiments could use the broad concepts of location determination based upon received wireless signals to implement any number of convenient features and other benefits.

Figure 2:
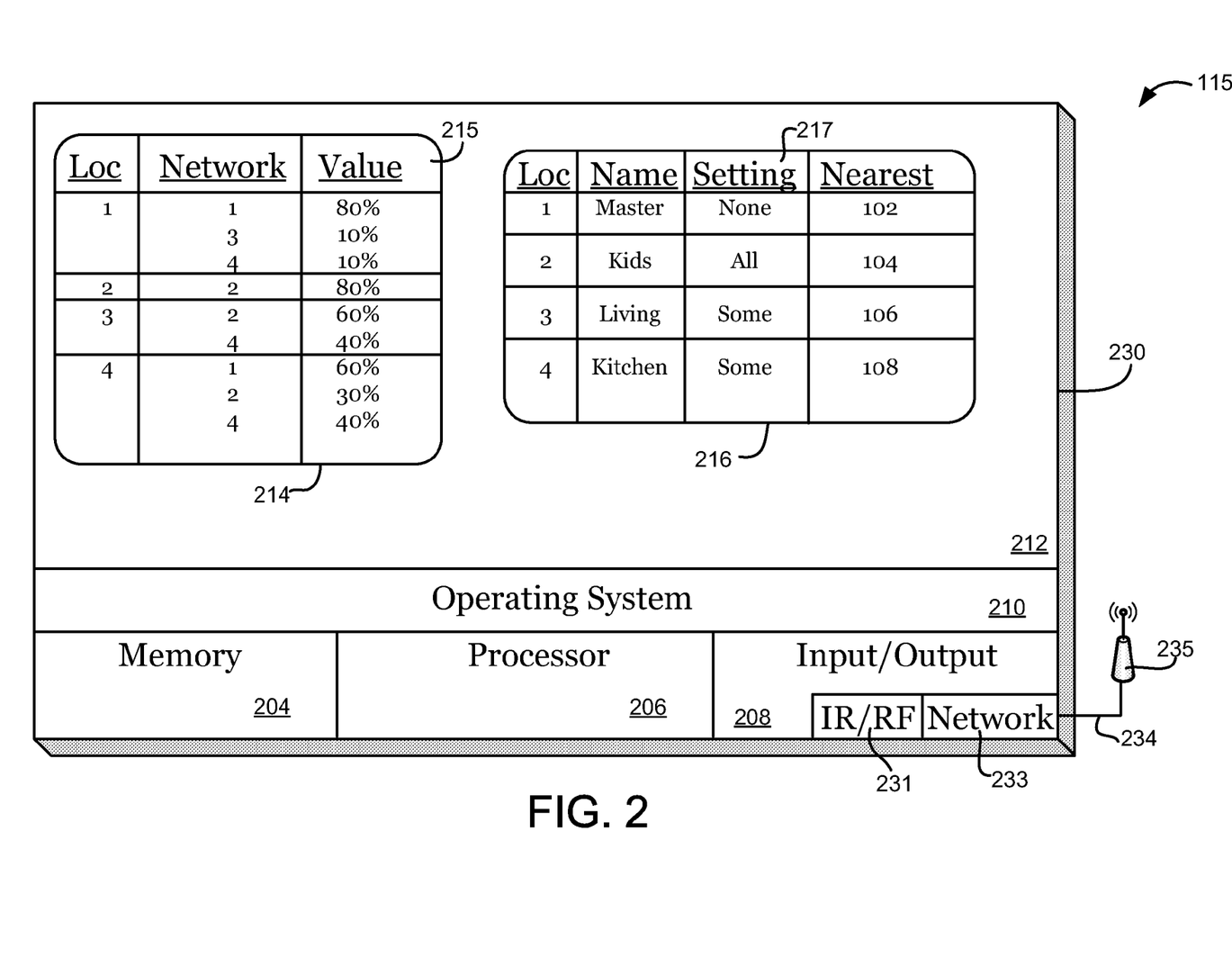
FIG. 2 is a diagram of an exemplary device that processes signal parameter data.

FIG. 2 provides additional detail about an exemplary device 115. As noted above, device 115 may represent a computer, a television display, remote control, media player or any other system, component or the like that is capable of receiving wireless networking signals from one or more transmitters in environment 100. In the example shown in FIG. 2, device 115 suitably includes a controller 230 that directs the operations of device 115 using any sort of conventional microprocessor 206, memory 204 and input/output features 208 as appropriate. Many different hardware and software platforms based upon any number of different operating systems are widely available from many different sources.

In most implementations, input/output features 208 of device 115 includes a wireless receiver 233 or similar interface that receives signals from any number of networks 121-124, as described herein. In a typical WLAN implementation, for example, wireless receiver 233 may include a conventional IEEE 802.11 interface that receives network signals using an internal or external antenna 235, as appropriate. Remote control implementations of device 115 may also include a conventional IR, RF or other interface 231 to provide command signals directly to controlled devices 102, 104, 106, 108. Other types of remote controls may alternately or additionally interact with controlled devices 102, 104, 106, 108 via one or more of the detected networks 121-124, as desired.

In some implementations, wireless receiver 233 includes an appropriate received signal strength indication (RSSI) feature that is able to measure the intensity of received network signals. This feature may be used to gather any amount of useful information, including information about the strength of received signals. Signal intensity may be measured from the magnitude of the baseband signal 234 that is received from antenna 235, for example. Other embodiments may provide signal strength measurement using digital signal processing within controller 230, or using other circuits or logic operating elsewhere in portable device 115.

Controller 230 includes any appropriate hardware, software and/or firmware logic 212 that interacts with hardware 204-208 via any sort of conventional operating system 210 to carry out the various functions of device 115. In various embodiments, logic 212 includes a software application, applet, object, script or other executable logic in source or object code form that can be stored in memory 204 and interpreted or executed by processor 206 to carry out the location-based features described herein.

As shown in FIG. 2, controller 230 maintains tables 214, 216 of information related to the location of device 115 within environment 100. Either of these tables may be maintained in memory 204 and/or stored in any sort of disk, long term memory or other mass storage associated with device 115, as desired. Although FIG. 2 shows tables 214, 216 as two distinct entities, equivalent embodiments may combine the two tables 214, 216 into a common data structure. Still other embodiments may organize the data in any other way that may result in different or additional data being stored and processed.

Table 214 maintains a log of signal parameters 215 received at various locations. In the example shown in FIG. 2, the parameter 215 is an indication of the strength of signals received from a particular transmitter. Entry "1" in table 214, for example, shows a relatively strong signal observed from network 121 and relatively weak signals received from networks 123 and 124. This information may have been stored when the device 115 was located at or near the position of controlled device 102. Entries "2", "3" and "4" in table 214 similarly show network signal strength measurements obtained when the device 115 was at or near controlled devices 104, 106 and 108, respectively. While table 214 shows signal strength values 215 that are measured in terms of percentages of a maximum value, in practice the actual measurements may be stored in any absolute or relative terms, such as dB, −dBm or the like, including any sort of arbitrary or non-standard units. The particular values stored or processed may represent a range, upper and/or lower threshold, average, mean, median and/or other representative values obtained from multiple signal strength samples, as desired. Still other embodiments may measure, store and process other values that are indicative of signal strength, such as signal-to-noise ratio or the like.

Other embodiments may determine and store signal parameters based upon factors other than signal strength. Examples of such parameters could include, without limitation, network names, network identifiers, security information about the network, signal phase or frequency, or any other parameters as desired. Network name or identifier information, for example, could be used to record the availability or non-availability of a particular network. This information may be sufficient to determine location in some embodiments even if signal strength measurements are inconvenient or otherwise unavailable.

In embodiments wherein device 115 does not control or interact with other devices 102, 104, 106, 108, parameter information in table 214 may nevertheless be obtained and stored to aid in determining the subsequent position of device 115. Some embodiments may not maintain parameters 215 for all of the networks or signals received by device 115. Certain networks or signals that are sporadic, under the control of other parties, and/or otherwise undesired may be removed from table 214 using any sort of inclusive (e.g., "opt-out"), exclusive (e.g., "opt-in"), and/or other filtering techniques as desired.

Table 216 associates the various locations with additional information, including a setting 217. In the example shown in FIG. 2, locations 1-4 are associated with devices 102-108, respectively, which are located at or near the particular location. Other embodiments that are not concerned with remote control features may simply maintain information for various locations within environment 100 without regard to other devices 102-108, as desired. FIG. 2 shows table 216 as maintaining a name for each position, as well as a setting 217. The name may be obtained from user inputs, as appropriate, and can be used to provide a convenient reference to the location during subsequent operation. The setting 217 can be any user preference, interface feature, or other configurable parameter as described above.

In the example of FIG. 2, setting 217 reflects a parental control parameter that is applied when the device 115 is located near device 104 (corresponding to a child's bedroom in FIG. 1) and removed when device 115 is located near device 102, with intermediate controls applied near devices 106 and 108. The parental control feature may apply to the device 115 itself (e.g., if device 115 is a portable computer or display), or may be transmitted and applied to a controlled device 102-108 if device 115 is a remote control. Again, setting 217 may represent any other configurable or variable parameters within device 115. In remote control embodiments, for example, setting 217 may be adjusted to select infrared, RF or other communications parameters used to transmit commands or to otherwise communicate with the nearest controlled device 102-108.

Controller 230 therefore directs the various functions of the device 115. These functions may include directing the receiving of signals from the various networks 121-124 via network interface 231 and antenna 235, identifying parameters of the received signals (e.g., measuring the strength of the received signals using RSSI functionality in receiver 233 or elsewhere), and/or determining the location of the device 115. As noted above, the location of device 115 may be determined with reference to another controlled device 102-108, or any other points of reference (e.g., rooms or other known positions) within environment 100.

Figure 3:
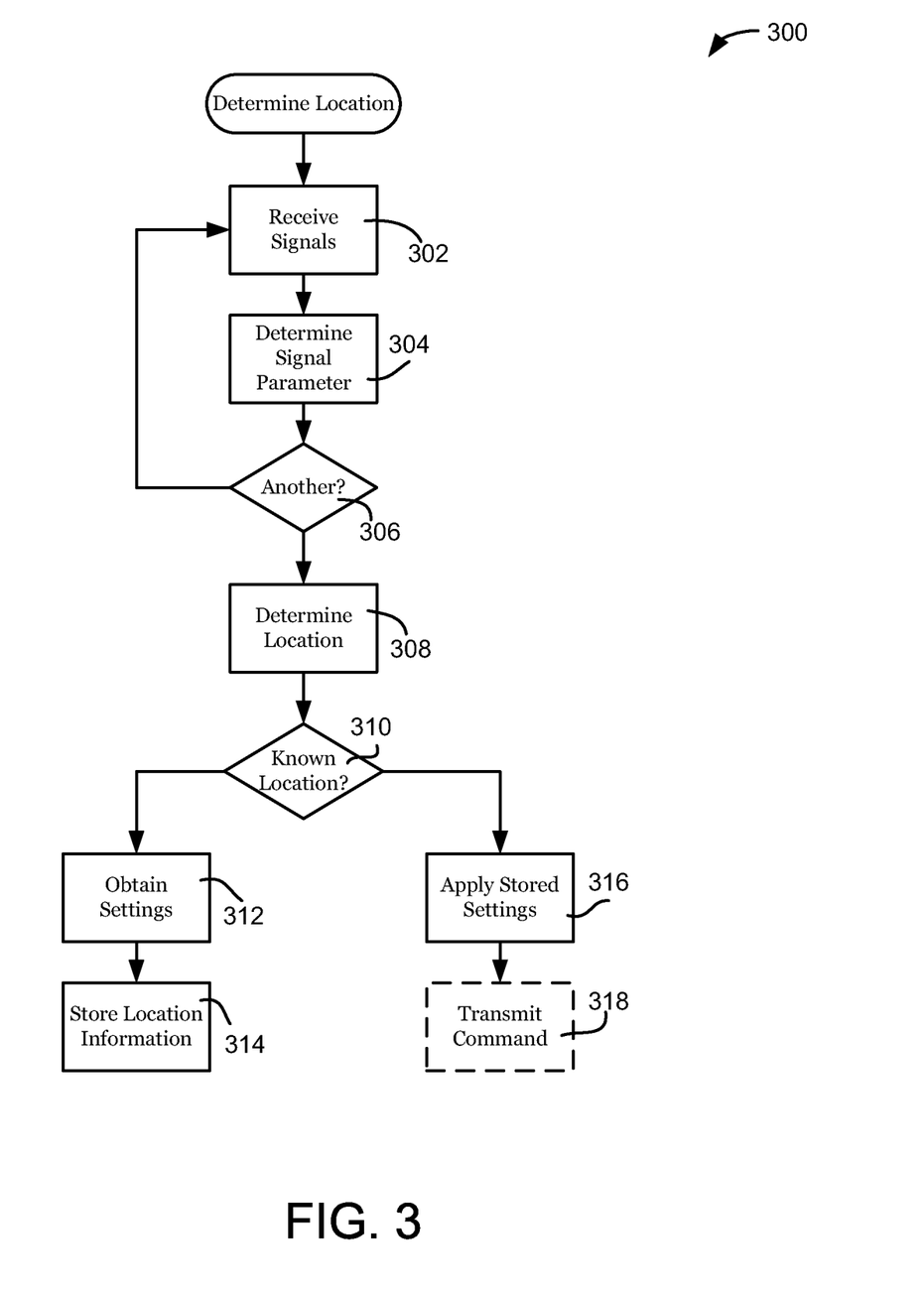
FIG. 3 is a flowchart of an exemplary process for determining the location and adjusting a setting of a device.

FIG. 3 shows an exemplary process 300 to determine the location of device 115 based on the signal parameters received from one or more transmitters associated with wireless networks 121-124. Process 300 may be executed by controller 230 in various embodiments, with logic 212 executing on processor 206 to carry out the various task of the process. Data and instructions associated with process 300 may be stored in memory 204 or elsewhere within device 115, as desired.

With reference now to FIG. 3, process 300 suitably includes the broad functions of receiving wireless networking signals (function 302) at the device 115 from one or more wireless networks (function 306), measuring signal strengths or other parameters of the received wireless networking signals (function 304), and determining a location of the device 115 within the environment based on the signal parameters of the wireless networking signals (function 308). If the location is known (function 310), then stored settings 217 may be applied (function 316) as desired. If the location is not known, then default settings may be applied and/or new settings information may be obtained and stored for the new location (functions 312 and 314), as desired, for later identification.

Wireless network signals are received in any manner (function 302). In various embodiments, wireless receiver 231 receives signals from any number of different networks 121-124, as described above. Each of these networks 121-124 can be individually selected or tuned by controller 230 or other logic on device 115 to isolate signals received from that particular network. Note that location determination function does not typically require device 115 to communicate on any particular network 121-124. To the contrary, it may be sufficient that device 115 merely receive a signal from the network and determine its parameter(s). Even if one or more received networks 121-124 is secure or emanates from a source that is beyond the user's control, then, the networks 121-124 may still be useful in determining the position of portable device 115. This feature may be particularly beneficial in apartment complexes, metropolitan areas with dense housing and office spaces, hospitals, campuses, office complexes and the like where many different networks 121-125 may be visible to device 115, even though only a relative few may be available for actual communications.

The parameters of the received signals are obtained in any manner (function 304). As noted above, signal parameters may be network name, identifier or security settings that simply identify the availability or non-availability of the network. In other embodiments, the strengths (e.g., signal intensities or magnitudes) of the received signals are measured in any appropriate manner. In various embodiments, controller 230 measures signal strength by requesting an RSSI measurement from the wireless receiver 233 that represents the intensity of the baseband signal 234 received from antenna 235 when the receiver 233. Alternatively, signal strength may be measured using digital processing executing within logic 212 or the like based upon data received from wireless receiver 233. As noted above, signal strength measurements may, in practice, represent averages, ranges, thresholds and/or other combinatorial values that are based upon multiple values sampled over any period of time.

Signals may be received and analyzed from any number of networks, transmitters, or other sources (function 306). In some embodiments, it may be possible to determine the position of device 115 from the strength of signals emanating from a single transmitter. If each of the locations of interest are located a different distance from the transmitter, for example (or if each location receives a different signal strength due to walls or other obstructions, signal interference, distance from the transmitter and/or any number of other factors), then signals from one transmitter may be sufficient to determine the positions of interest. In other embodiments, however, signals are received from multiple transmitters to provide finer resolution and improved accuracy. Also, as noted above, signals may be received from multiple transmitters that are associated with the same physical or logical network, in some cases. A WLAN may have multiple access points or other signal transmitters that are all associated with a common logical network, for example. Signals received from each transmitter may nevertheless be treated separately to determine the location of the receiving device 115, as desired.

Device 115 determines its location within environment 100 using the obtained parameter values (function 308). As noted previously, the location may be determined with reference to another device (e.g., a controlled device 102-108), with reference to previously-stored parameter values, or in any other manner. To that end, the current signal parameter values measured in function 304 are compared to known values in table 214 or the like to identify any known locations that correlate to the recently-obtained values. The most recent values may not match the stored values in all cases. Indeed, networks 121-124 may go up or down, signal strength may vary with time and environmental conditions, and other variations may occur that can prevent an exact match to the stored values. Nevertheless, if the more recent values even approximate the stored values, a matching position can still be identified. In some embodiments, the position of device 115 may be determined to the known location that "best matches" the currently-observed network parameters. Any number of other algorithms and techniques for matching, correlating and otherwise comparing the prior and current signal parameter values may be used in a wide variety of alternate but equivalent embodiments.

If the location of device 115 cannot be determined in function 308 (function 310), the location may be deemed to be a new location that has not been previously (or at least recently) encountered. Likewise, if the signal characteristics for a previously-known location have changed, the currently-observed signal characteristics may be associated with the known location using an update or replace function.

Default settings may be applied for new or otherwise unknown locations as desired. In other embodiments, the user may be prompted to provide a name and/or any desired settings to use at the new location, as desired (function 312). This information may be stored, for example, in table 216 or the like. In various embodiments, device 115 provides a user interface that allows the user to enter specific information, such as parental control restrictions. In other embodiments, the device 115 may allow the user to simply preserve current settings (e.g., user interface preferences or the like) as the preference for the current location. Other embodiments may set or adjust settings 217 in any other manner.

If the current location of the device is known (function 310), then stored settings 217 may be applied (function 316) in any manner. As noted above, the setting 217 may relate to a parental control, an interface configuration feature, any sort of user preference, or the like. Any number of settings 217 may be applied to various locations, as desired, and the particular settings 217 may apply to the device 115 itself and/or to a controlled device 102-108 if the device 115 is a remote control.

As noted above, any number of equivalent embodiments could be formulated to exploit any numbers and/or types of settings 217 that may be applied to any portable or stationary device 115, controlled device 102-108 and/or the like. In remote control embodiments, the setting 217 may be associated in table 216 or elsewhere with a controlled device in relative proximity to the portable remote control device 115. The setting 217 may provide an infrared, RF or other code used in communicating with the controlled device that is identified as being in closest proximity to device 115. In such embodiments, a command is sent (function 318) to the controlled device using IR or RF transmitter 231, using network communications over one or more networks 121-124, or using any other transport medium. The command may be used to adjust the configuration of controlled device 102-108 (e.g., to apply a setting 217), or the command may simply provide conventional remote control functionality using codes or formats specified by setting 217.

As noted at the outset, many different embodiments may apply the concept of location determination in any number of different ways. A portable television display or portable computer, for example, may automatically adjust an interface, provide an application or document, apply a parental control or take any other action based upon the location of the device within the home, office or other environment. A remote control device could similarly use location information to select a controlled device that is within relative proximity, thereby allowing for automatic selection of control target devices as the remote is moved throughout the environment. Location information may be used to enforce security or anti-theft settings of computers, televisions, media players or other stationary or portable devices 115. Many other alternate but equivalent embodiments could be formulated using the concepts, structures and processes set forth herein.

The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A method executable by a device operating within an environment, the method comprising:
   receiving wireless signals at the device from at least one wireless signal source;
   obtaining a parameter of the wireless signals received from the at least one wireless signal sources by the device;
   determining, by the device, a location of the device within the environment based on the measured parameter of the wireless signals; and
   adjusting a setting of the device based upon the determined location of the device within the environment, wherein the adjusting comprises the device automatically enabling or disabling a feature of the device based upon the determined location of the device within the environment so that the feature is enabled when the device is located in some parts of the environment but disabled when the device is located in other parts of the environment.

2. The method of claim 1 wherein the adjusting comprises disabling some or all operations of the device if the determined location indicates that the device has been moved from a known location.

3. The method of claim 1 wherein the adjusting comprises disabling the device if the determined location indicates that the device has been moved from a known location.

4. The method of claim 1 wherein the at least one wireless signal source is a wireless network access point that broadcasts wireless signals associated with a wireless network to at least a portion of the environment.

5. The method of claim 1 wherein the device is a media player device, and wherein the adjusting comprises adjusting a parental control feature of the media player device based upon the location of the device within the environment so that the media player device is enabled to play at least some types of content while the device is located in certain portions of the environment but disabled from playing the certain types of content when the device is located in other portions of the environment.

6. The method of claim 1 wherein the adjusting further comprises adjusting a user interface feature of the device based upon the location of the device within the environment.

7. The method of claim 1 wherein the wireless signals are wireless networking signals, and wherein the parameter describes measured signal strengths of the wireless networking signals, and wherein the receiving comprises receiving the wireless networking signals from each of a plurality of wireless transmitters, and wherein the determining comprises correlating the measured signal strengths with previously-stored signal strength values from each of the plurality of wireless transmitters.

8. The method of claim 7 wherein the correlating is based upon a range of signal strengths.

9. The method of claim 1 wherein the wireless signals are wireless networking signals, wherein the parameter identifies a network associated with each of the wireless networking signals, and wherein the receiving comprises receiving the wireless networking signals from each of a plurality of wireless networks.

10. The method of claim 1 wherein the wireless signals are wireless networking signals.

11. A device configured to operate within an environment, the device comprising:
   a wireless receiver within the device configured to receive wireless networking signals from each of a plurality of wireless transmitters and to determine signal strengths of the wireless networking signals received from each of the plurality of wireless transmitters;
   a memory configured to store a plurality of settings at the device; and
   a controller coupled to the wireless receiver and to the memory, wherein the controller is configured to determine a location of the device within the environment based upon the signal strengths of the wireless networking signals received from each of the plurality of wireless transmitters, and to automatically disable at least one feature of the device based upon the location of the device within the environment so that the at least one feature of the device is enabled at at least one location within the environment and disabled at at least one other location within the environment.

12. The device of claim 11 wherein device is disabled if the determined location indicates that the device has been moved from a known location.

13. The device of claim 11 wherein the controller is configured to determine the location of the device by comparing the signal strengths of the wireless networking signals received from each of the plurality of wireless transmitters with stored values representing strengths of wireless networking signals previously received from each of the wireless transmitters when the portable device was in relative proximity to one of the plurality of controllable devices.

14. The device of claim 11 further comprising an antenna that provides a baseband signal that comprises the received wireless networking signals to the wireless receiver, and wherein the wireless receiver determines the signal strengths of the wireless networking signals based upon the intensity of the baseband signal.

15. The device of claim 11 wherein the device comprises a media player, and wherein the controller is configured to disable playback of certain types of content by the device when the device is located at certain portions of the environment but to enable playback of the certain types of content by the device when the device is located in other portions of the environment.

16. A method executable by a portable media player device, the method comprising:
   for each of a plurality of known locations, the portable media player device initially measuring signal strengths of signals received at the portable media player device from each of a plurality of wireless networks;
   storing the measured signal strengths at the portable media player device;
   subsequently measuring the strengths of the signals received at the portable media player device from each of the plurality of wireless networks by the portable media player device;
   comparing, by the portable media player device, the subsequently-measured strengths to the initially-measured signal strengths to thereby select one of the known locations as a determined location of the portable media player device; and
   the portable media player automatically implementing a location-based parental control for content presented by the portable media player device so that playback of at least some types of media content is enabled when the portable media player device determines that it is located at certain known locations and disabled when the media player device determines that it is located at other known locations.

17. The method of claim 16 further comprising changing a user interface associated with the portable device based upon the determined location of the portable media player device.

* * * * *